(12) United States Patent
Park et al.

(10) Patent No.: US 10,602,510 B2
(45) Date of Patent: Mar. 24, 2020

(54) OPERATION METHOD IN WIRELESS LAN SYSTEM AND APPARATUS THEREFOR

(71) Applicant: LG ELECTRONICS INC., Seoul (KR)

(72) Inventors: Sungjin Park, Seoul (KR); Jinmin Kim, Seoul (KR); Hangyu Cho, Seoul (KR); Kyungtae Jo, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 15/918,754

(22) Filed: Mar. 12, 2018

(65) Prior Publication Data

US 2018/0255537 A1    Sep. 6, 2018

Related U.S. Application Data

(63) Continuation of application No. PCT/KR2016/010156, filed on Sep. 9, 2016, and a
(Continued)

(51) Int. Cl.
*H04W 72/04* (2009.01)
*H04W 74/08* (2009.01)
(Continued)

(52) U.S. Cl.
CPC .......... *H04W 72/044* (2013.01); *H04L 5/001* (2013.01); *H04L 5/0048* (2013.01);
(Continued)

(58) Field of Classification Search
CPC ............. H04W 72/044; H04W 72/042; H04W 74/006; H04W 84/12; H04L 5/0094; H04L 5/0053; H04L 5/001
See application file for complete search history.

(56) References Cited

U.S. PATENT DOCUMENTS 8,027,301 B2   9/2011   Oyman et al.
8,077,802 B2   12/2011  Sandhu et al.
(Continued)

FOREIGN PATENT DOCUMENTS

KR    1020110089802    8/2011
WO    2015076854       5/2015

OTHER PUBLICATIONS

PCT International Application No. PCT/KR2016/010156, Written Opinion of the International Searching Authority dated Dec. 15, 2016, 21 pages.
(Continued)

*Primary Examiner* — Hashim S Bhatti
(74) *Attorney, Agent, or Firm* — Lee Hong Degerman Kang Waimey

(57) ABSTRACT

The present specification relates to an operation configuration of a station and an access point in a wireless LAN (WLAN) system. More particularly, disclosed are a method for operating a station or an access point in a wireless LAN system and an apparatus therefor. In particular, the present specification suggests an operation method for supporting a multi-channel operation of a station and an access point, and an apparatus therefor.

9 Claims, 15 Drawing Sheets

Related U.S. Application Data continuation of application No. PCT/KR2016/010158, filed on Sep. 9, 2016.

(60) Provisional application No. 62/217,050, filed on Sep. 11, 2015, provisional application No. 62/249,370, filed on Nov. 2, 2015, provisional application No. 62/217,047, filed on Sep. 11, 2015, provisional application No. 62/249,372, filed on Nov. 2, 2015.

(51) Int. Cl.
*H04L 5/00* (2006.01)
*H04W 84/12* (2009.01)
*H04W 74/00* (2009.01)
*H04L 27/26* (2006.01)

(52) U.S. Cl.
CPC .......... *H04L 5/0053* (2013.01); *H04L 5/0094* (2013.01); *H04W 72/042* (2013.01); *H04W 74/0816* (2013.01); *H04L 27/2602* (2013.01); *H04W 74/006* (2013.01); *H04W 84/12* (2013.01)

(56) References Cited

U.S. PATENT DOCUMENTS

| | | | |
|---|---|---|---|
| 9,736,855 B2 * | 8/2017 | Zhou | H04W 72/1268 |
| 2013/0070701 A1 * | 3/2013 | Merlin | H04W 74/002 |
| | | | 370/329 |
| 2014/0079016 A1 | 3/2014 | Dai et al. | |
| 2014/0112273 A1 * | 4/2014 | Aboul-Magd | H04L 69/323 |
| | | | 370/329 |
| 2014/0307653 A1 * | 10/2014 | Liu | H04W 74/006 |
| | | | 370/329 |
| 2015/0131756 A1 | 5/2015 | Suh et al. | |
| 2015/0359008 A1 * | 12/2015 | Wang | H04W 74/004 |
| | | | 370/330 |
| 2017/0048844 A1 * | 2/2017 | Chen | H04W 72/0413 |
| 2017/0338935 A1 * | 11/2017 | Ahn | H04L 5/0064 |

OTHER PUBLICATIONS

PCT International Application No. PCT/KR2016/010158, Written Opinion of the International Searching Authority dated Jan. 26, 2017, 25 pages.

Adachi, T. et al., "DL OFDMA Signalling", doc.: IEEE 802.11-15/0854r2, Jul. 2015, 14 pages.

* cited by examiner

| CH 1 | L - STF | L - CE | L - Header | ay Header A | ay STF | ay CE | ay Header B | ay payload |
|------|---------|--------|------------|-------------|--------|-------|-------------|------------|
|      | GF-STF  | GF-CE  |            |             |        |       |             |            |
| CH 2 | L - STF | L - CE | L - Header | ay Header A |        |       |             |            |

(L: legacy, GF: gap filling, ay: 802.11ay)

FIG. 21

| RU size | 2.14 GHz (1 Channel BW) | Smaller than 2.14 GHz |
|---|---|---|
| multiplexing capability | Supporting up to 4 STAs simultaneously if the channels in 11ay fully used | Supporting more than 4 users simultaneously by finer multiplexing in frequency |
| Example of RU allocation | One STA per one RU (RU size: 2.14 GHz)<br><br>CH1 — STA A<br>CH2 — STA B<br>CH3 — STA C<br>CH4 — STA D | One STA per one RU (RU size: 2.14/2 GHz)<br><br>CH1 — STA A / STA B<br>CH2 — STA C / STA D<br>CH3 — STA F / STA G<br>CH4 — STA H / STA I |
| Signaling overhead | Low | Burden on signaling and scheduling overhead as intended STAs increase ; Without fine frequency scheduling, it is difficult to expect significant gain |
| Feedback overhead | Low | Coherent BW may be large due to characteristic of EHF*, but total reporting time linearly increase as intended STAs increase |
| Impact on frame structure | MU-MIMO frame structure considered in 11ay is easily reused | It is required to define optimized frame structure for OFDMA |
| Complexity | Mostly reuse the parameter in 11ad and channel bonding (e.g. encoding block size, tone mapping) | Encoding block should be newly defined for each scheduled RU size. (hardware complexity is increased) |

* EHF: Extremely high frequency

OPERATION METHOD IN WIRELESS LAN SYSTEM AND APPARATUS THEREFOR

CROSS-REFERENCE TO RELATED APPLICATIONS

This application is a continuation of PCT International Application No. PCT/KR2016/010156, filed on Sep. 9, 2016, currently pending, which claims the benefit of U.S. Provisional Application No. 62/217,050, filed on Sep. 11, 2015 and 62/249,370, filed on Nov. 2, 2015 and is a continuation of PCT International Applications No. PCT/KR2016/010158, filed on Sep. 9, 2016, currently pending, which claims the benefit of U.S. Provisional Application No. 62/217,047, filed on Sep. 11, 2015 and 62/249,372, filed on Nov. 2, 2015, the contents of which are all hereby incorporated by reference herein in their entirety.

TECHNICAL FIELD

Following description relates to operation configurations of a station and an access point in a wireless LAN (WLAN) system, and more particularly, to a method of operating a station or an access point in a wireless LAN system and an apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

DISCLOSURE OF THE INVENTION

Technical Task

If a different channel rather than a primary channel on a system is assigned to a specific station (STA), it is required to designate a channel capable of being used by the specific STA as a primary channel during a period to which the different channel is assigned.

In particular, it is required to perform study on a method of forming a BSS in consideration of compatibility with a legacy system (e.g., 11ad STA).

Technical Solution

To achieve these and other advantages and in accordance with the purpose of the present invention, as embodied and broadly described, according to one embodiment, a method of operating a first station (STA) in a wireless LAN (WLAN) includes the steps of receiving assignment information on one or more channels from an access point (AP) through a first primary channel, and if the first primary channel is not included in the one or more channels, receiving information indicating that a channel among the one or more channels is designated as a second primary channel from the AP. In this case, the first STA uses the second primary channel as a primary channel during a period to which the one or more channels are assigned.

If the one or more channels correspond to a plurality of channels, the first STA can transmit data to a second STA by combining a plurality of the channels with each other on the basis of the second primary channel.

Meanwhile, the assignment information on the one or more channels and information on the second primary channel can be received through an EDMG (enhanced directional multi-gigabit) beacon or an announcement frame.

Meanwhile, the period to which the one or more channels are assigned includes a CBAP (contention-based access period) or an SP (service period) and if the period to which the one or more channels are assigned corresponds to the CBAP, the first STA can perform backoff or frame decoding through the second primary channel.

Meanwhile, the assignment information on the one or more channels and information on the second primary channel can be transmitted through an EDMG (enhanced directional multi-gigabit) beacon or an extended schedule element included in an announcement frame.

In this case, the extended schedule element includes an allocation control field and the allocation control field can include the information on the second primary channel and information on a bandwidth allocated to the first STA.

And, information on whether or not the first STA is able to access a different channel rather than the first primary channel during DTI (data transfer interval) can be additionally transmitted to the AP.

Meanwhile, if the period to which the one or more channels are assigned ends, the first STA can use the first primary channel as a primary channel instead of the second primary channel.

Or, if a beacon frame indicating to use the first primary channel as a primary channel is received from the AP after data is transmitted to a second STA, the first STA can use the first primary channel as a primary channel instead of the second primary channel.

Or, if data transmission transmitted to a second STA is completed, the first STA immediately can use the first primary channel as a primary channel instead of the second primary channel.

To further achieve these and other advantages and in accordance with the purpose of the present invention, according to a different embodiment, a method of operating an AP (access point) in a wireless LAN (WLAN) system includes the steps of transmitting assignment information on one or more channels to an STA (station) through a first primary channel, and if the first primary channel is not included in the one or more channels, transmitting information indicating that a channel among the one or more channels is designated as a second primary channel to the STA. In this case, the AP controls the STA to use the second primary channel as a primary channel during a period to which the one or more channels are assigned.

To further achieve these and other advantages and in accordance with the purpose of the present invention, according to a further different embodiment, a station operating in a wireless LAN (WLAN) includes a transceiver configured to receive scheduling information from an AP (access point) with one or more RF (radio frequency) chains and a processor configured to process the scheduling information received by the transceiver in a manner of being connected with the transceiver, the processor configured to control the transceiver to receive assignment information on one or more channels from an access point (AP) through a first primary channel, the processor, if the first primary channel is not included in the one or more channels, configured to control the transceiver to receive information indicating that a channel among the one or more channels is designated as a second primary channel from the AP, the processor configured to use the second primary channel as a primary channel during a period to which the one or more channels are assigned.

To further achieve these and other advantages and in accordance with the purpose of the present invention, according to a further different embodiment, an AP (access point) operating in a wireless LAN (WLAN) system includes a transceiver configured to receive scheduling information from an AP (access point) with one or more RF (radio frequency) chains and a processor configured to process the scheduling information received by the transceiver in a manner of being connected with the transceiver, the processor configured to control the transceiver to transmit assignment information on one or more channels to an STA (station) through a first primary channel, the processor, if the first primary channel is not included in the one or more channels, configured to control the transceiver to transmit information indicating that a channel among the one or more channels is designated as a second primary channel to the STA, the processor configured to control the STA to use the second primary channel as a primary channel during a period to which the one or more channels are assigned.

Advantageous Effects

According to the present invention, if one or more channels not including a primary channel on a system are assigned to a station (STA), it is able to designate a channel capable of being used by the STA as a primary channel during a period to which the one or more channels are assigned. By doing so, it is able to support a multi-channel operation.

In particular, an STA according to the present invention can form a BSS in a manner of being compatible with a legacy STA (e.g., 11ad STA).

The effects that may be obtained by the present invention are not limited to the above-mentioned effects, and other effects not mentioned above will be clearly understood by those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 21 is a diagram for comparing a system characteristic according to an RU size for OFDMA.

BEST MODE

Mode for Invention

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

Figure 1:
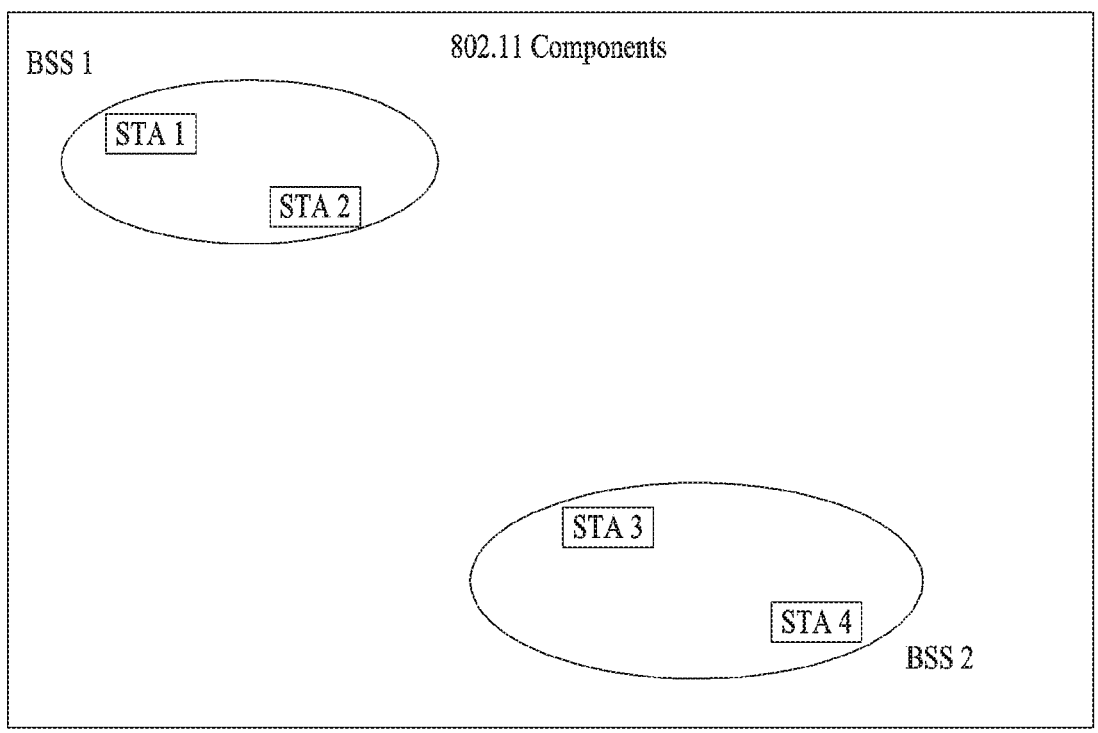
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
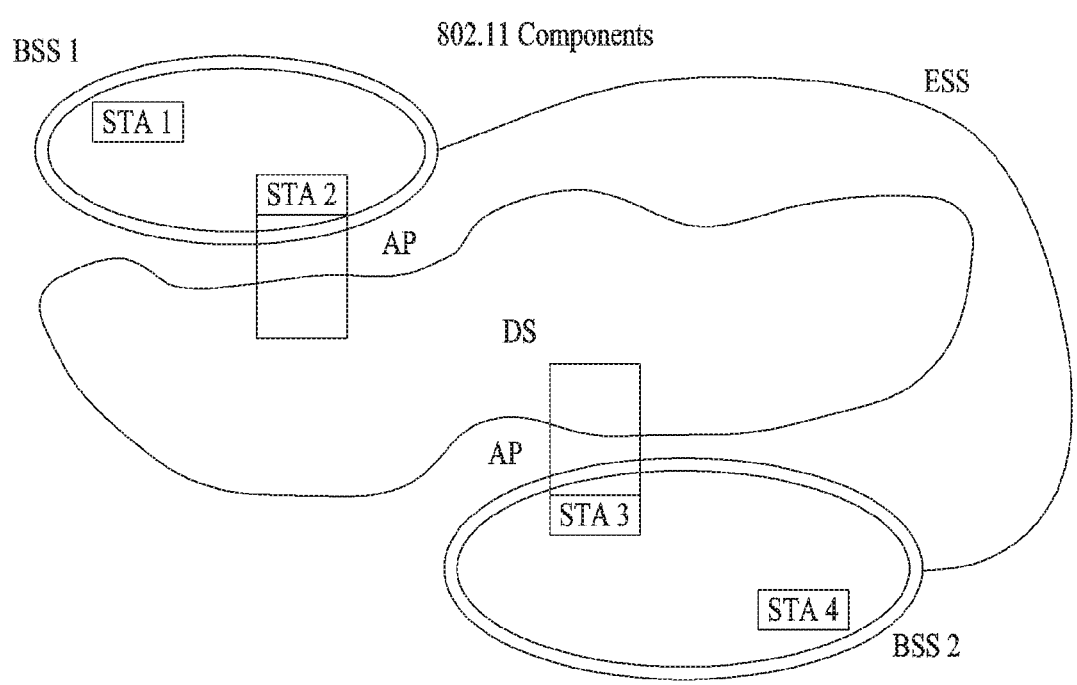
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

Figure 3:
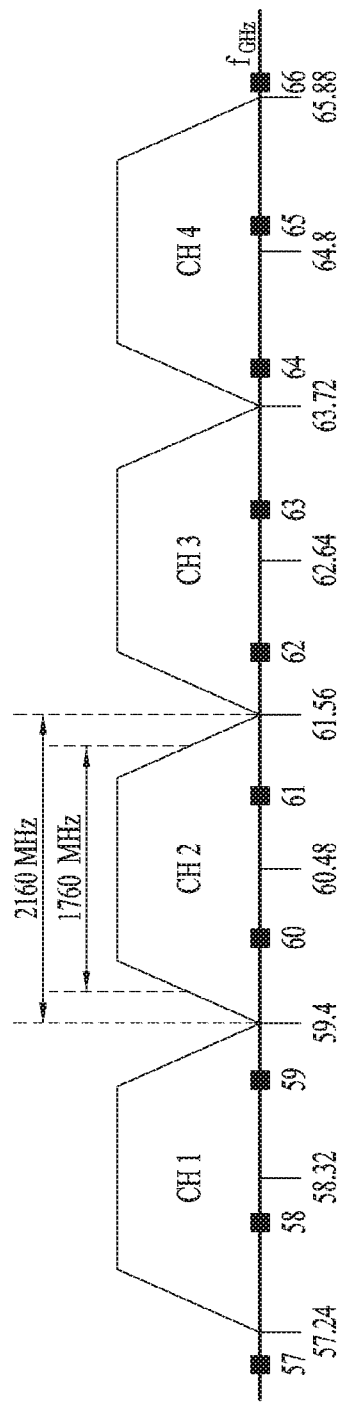
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
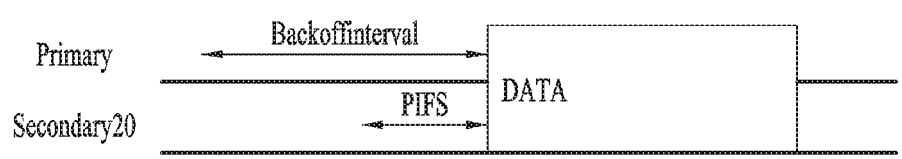
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11 ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

Figure 5:
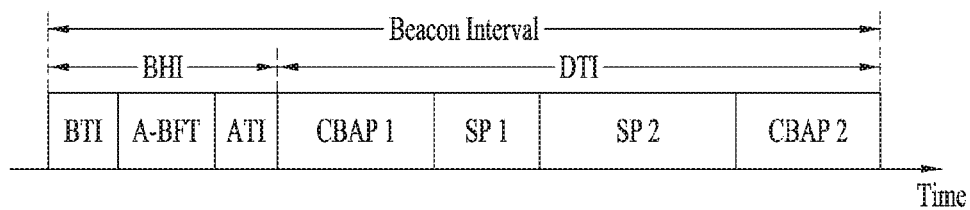
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY (SC PHY) | 1 ... 12 25 ... 31 | (low power SC PHY) |
| OFDM PHY | 13 ... 24 | |

Such modulation modes may be used to satisfy different requirements (e.g., high throughput or stability). Depending on the system, only some of these modes may be supported.

Figure 6:
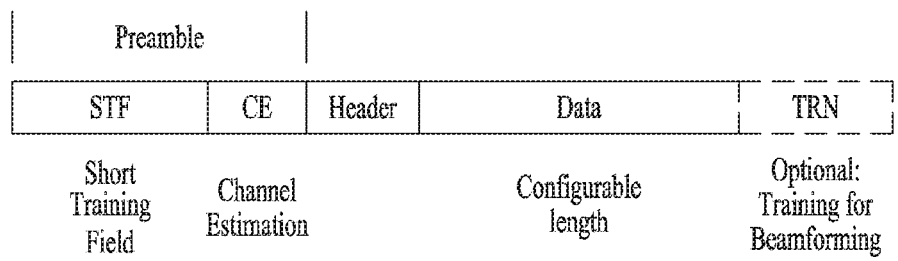
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
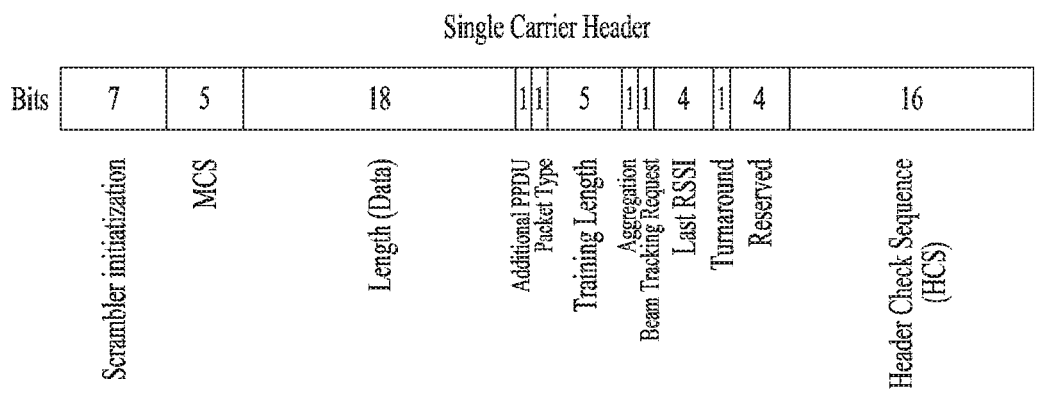
FIGS. 7 and 8 are diagrams illustrating configuration of the header field of the radio frame of FIG. 6.
Figures 8, 9:
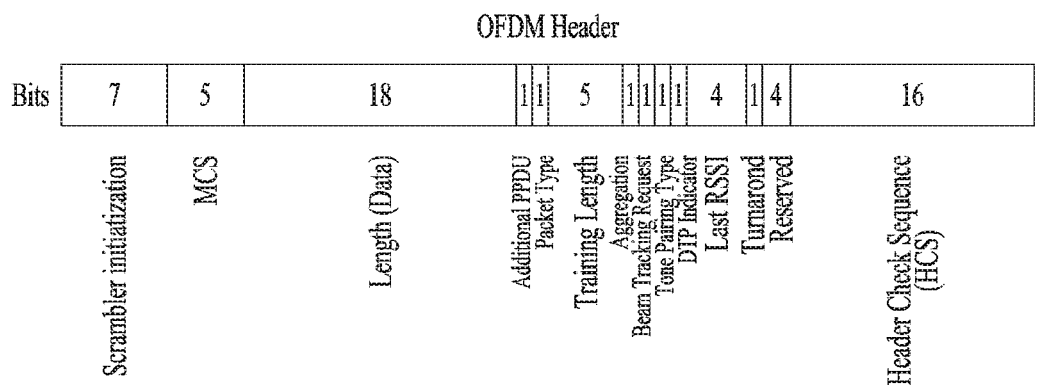
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam training request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam training request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of four channels (2.16 GHz) may be present in 11ay. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B is transmitted in a wideband after the legacy preamble, legacy header, and ay header A, without the GF-STF and GF-CE field indicated by the dotted line in FIG. 8.

When one or more channels are assigned to 11ay STA, if a primary channel is not included in the one or more channels, a method of operating the 11ay STA and a PCP/AP is explained in detail in the present invention based on the aforementioned contents.

Figure 10:
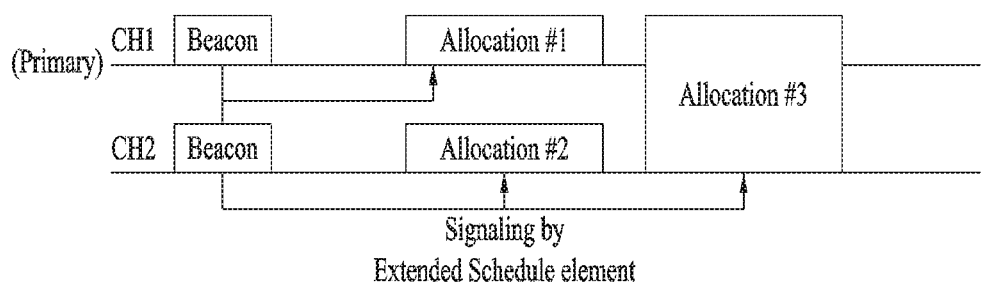
FIGS. 10 and 11 are diagrams illustrating a multi-channel operation according to the present invention.
Figure 11:
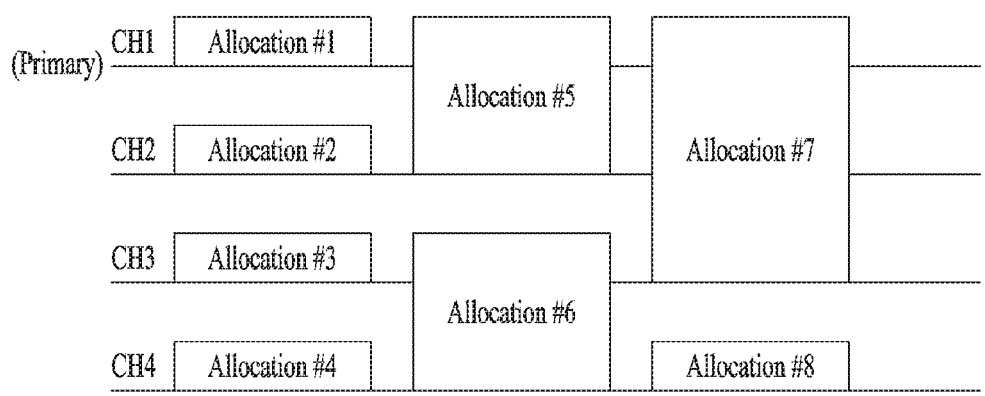

FIGS. 10 and 11 are diagrams illustrating a multi-channel operation according to the present invention.

As shown in FIG. 10, periods of Allocation #1 to #3 can be allocated to an STA through a beacon message. The beacon message can be transmitted through not only a primary channel, CH1 but also a secondary channel, CH2. In some cases, to reduce signal overhead, the beacon message may be transmitted through only the primary channel, CH1. In FIG. 10, Allocation #1 to #3 mean allocation periods allocated to each STA, and a CBAP or an SP may be applied to each of the allocation periods according to an embodiment. In FIG. 11, Allocation #1 to #8 mean allocation periods allocated to each STA, and a CBAP or an SP may be applied to each of the allocation periods.

In this case, among a plurality of channels provided by the system, at least one channel may be allocated to each STA according to the channel bonding capability or channel environment of each STA, and the primary channel of the system may not be included in the at least one channel. In this case, the number of the plurality of channels may be set to 6.

However, if the at least one channel except the primary channel is allocated to STAs like Allocation #2 of FIG. 10 and Allocation #2 to #4, #6, and #8 of FIG. 11, the STAs may be unable to use the primary channel of the system, CH1, and thus, it is necessary to establish a configuration for using a separate channel as a primary channel during a period in which the at least one channel is allocated. Thus, according to the present invention, a PCP/AP transmits, to each STA, information indicating the separate channel that can be used as the primary channel by the STAs during the period in which the at least one channel except the primary channel of the system, CH1 is allocated to the STAs. In this case, one of the at least one channel may be designated as the separate channel, which can be used as the primary channel during the period in which the at least one channel is allocated.

By doing so, each STA can use, as the primary channel, either the primary channel of the system, CH1 or the separate channel during the period in which the at least one channel is allocated. For example, the STA receiving the allocated channel(s) can decode a preamble part of a PPDU frame through the newly designated primary channel during the allocation period(s) like Allocation #2 of FIG. 10 and Allocation #2 to #4, #6, and #8 of FIG. 11. Alternatively, if the allocation period(s) is a CBAP, the STA may perform a backoff operation through the newly designated primary channel rather than CH1 during the allocation period(s).

In addition, like Allocation #6 of FIG. 11, the STA receiving the allocated multiple channels except the primary channel of the system (i.e., CH1) can transmit data to another STA during the period in which the plurality of channels are allocated by bonding the plurality of channels with reference to the newly designated primary channel rather than the primary channel of the system (i.e., CH1).

Hereinafter, a description will be given of a signaling configuration for operating an PCP/AP and an STA, and a particular operation method based on the signaling configuration will be described.

Embodiment 1. Addition of New EDMG Operation Element

According to an embodiment of the present invention, a new element, i.e., an EDMG operation element can be added to a body of a management frame (e.g., beacon frame, association frame, etc.), and the management frame can be transmitted and received between the PCP/AP and STA, thereby transmitting and receiving primary channel information and secondary channel offset information.

For example, when at least one channel except the primary channel supported by the system is allocated to a specific STA, the PCP/AP may provide information indicating a channel that can be used as the primary channel by transmitting the management frame including the EDMG operation element to the specific STA.

The EDMG operation element may have a structure similar to that of a high throughput (HT) operation element of the 11an or 11ac system. In addition, the EDMG operation element may include a one-octet primary channel field as a field indicating the primary channel information and a two-bit EDMG operation information field including the secondary channel offset information.

Option 1) Signaling Through New Field

For all STAs in a BSS, the PCP/AP can designate one of a plurality of channels as an alternative primary channel through an alternative primary channel field, which is a new field, during multiple beacon intervals in which the signaling result is maintained.

Although Table 2 and Table 3 below show an example of signaling indicating that the total number of channels supported by the system is 4, the total number of the channels can be extended to 6. That is, the number of bits in bit information indicating the alternative primary channel may be increased according to the total number of channels.

TABLE 2

| Bit n | Bit n + 1 | Description |
|---|---|---|
| 0 | 0 | Alternative primary channel = original primary channel |
| 0 | 1 | Alternative primary channel = (the number of original primary channel + 1) mod 4 |
| 1 | 1 | Alternative primary channel = (the number of original primary channel + 2) mod 4 |
| 1 | 0 | Alternative primary channel = (the number of original primary channel + 3) mod 4 |

TABLE 3

| Bit n | Bit n + 1 | Description |
|---|---|---|
| 0 | 0 | Channel 1 is alternative primary channel |
| 0 | 1 | Channel 2 is alternative primary channel |
| 1 | 1 | Channel 3 is alternative primary channel |
| 1 | 0 | Channel 4 is alternative primary channel |

Option 2) Determination of Selection Rule of Alternative Primary Channel

Unlike section 2-1-1-1, the alternative primary channel can be configured during the period in which the at least one channel is allocated, by defining a selection rule of the alternative primary channel as follows without addition of the new field compared to the conventional system. In the following description, it is assumed that the total number of channels supported by the system is 4, but the total number of channels may be set to 6, 8 or greater depending on embodiments. In other words, the selection rule can be modified.

When channels 1 and 2 are the primary channel, the alternative primary channel is channel 3.

When channels 3 and 4 are the primary channel, the alternative primary channel is channel 2.

Alternative primary channel=(The number of primary channel+2) mod 4

The above flexible channel allocation and alternative primary channel signaling may be performed on a basis of the EDMG operation element in the body of the beacon or announcement (announce) frame.

Figure 12:
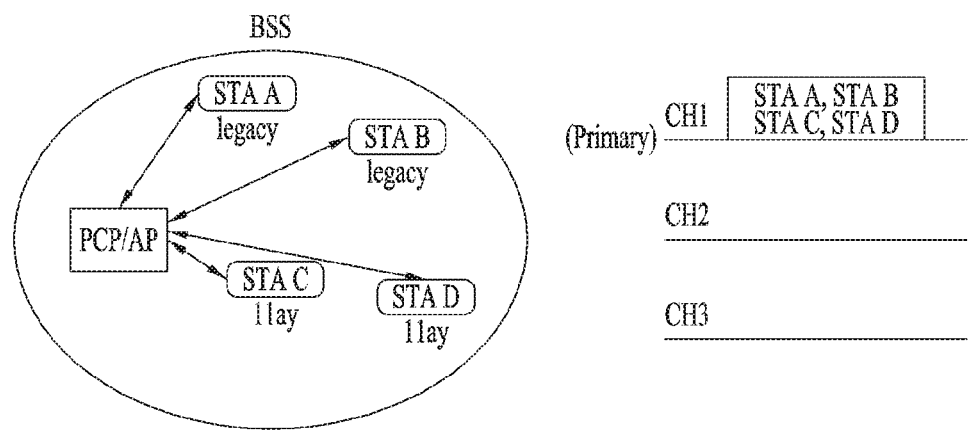
FIG. 12 is a diagram illustrating a signaling configuration according to one embodiment of the present invention.

Embodiment 2. Modification of DMG Operation Element According to Existing 11ad System According to another embodiment of the present invention, the PCP/AP can support a multi-channel operation of the STA using the existing DMG operation element included in the body of the management frame (e.g., beacon frame, association frame, etc.) of the 11ad system. As shown in FIG. 12, a DMG operation information field may include 13 reserved bits. Through these reserved bits, information on at least one channel allocated to the STA, information on an allocation period in which the at least one channel is allocated, information on a primary channel during the allocation period can be signaled.

In this case, whether the period in which the at least one channel is allocated is 'SP allocation out of primary channel' or 'CBAP allocation out of primary channel' can be indicated to each STA through an allocation type field in an extended schedule element. By doing so, each STA can know whether the system performs a channel access scheme based on at least one channel except the pre-configured primary channel during the DTI.

In this case, as a signaling method, methods in Embodiment 1 can be applied in a similar manner.

Figure 13:
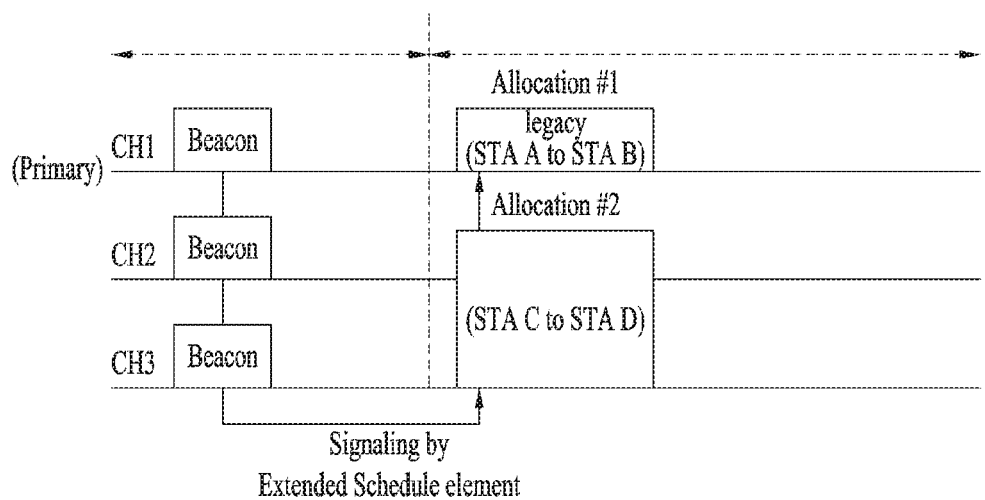
FIG. 13 is a diagram illustrating a scheduling-based signaling configuration according to a different embodiment of the present invention.

Embodiment 3. Designation of Alternative Primary Channel within Extended Schedule Element FIG. 13 is a diagram illustrating an extended schedule element included in a beacon frame body or an announcement (announce) frame body of the 11ad system. Referring to FIG. 13, the PCP/AP allocates the CBAP and/or the SP corresponding to the channel access scheme during the DTI to DMG STAs through an allocation field of the extended schedule element. The allocation field includes an allocation control subfield, and the allocation control subfield includes a reserved subfield with a length of 4 bits.

According to an embodiment of the present invention, the alternative primary channel can be informed as follows using 2-bit information among reserved bits included in the extended schedule element.

TABLE 4

| Bit 12 | Bit 13 | Description |
|--------|--------|-------------|
| 0 | 0 | Alternative primary channel = original primary channel |
| 0 | 1 | Alternative primary channel = (the number of original primary channel + 1) mod 4 |
| 1 | 1 | Alternative primary channel = (the number of original primary channel + 2) mod 4 |
| 1 | 0 | Alternative primary channel = (the number of original primary channel + 3) mod 4 |

TABLE 5

| Bit 12 | Bit 13 | Description |
|--------|--------|-------------|
| 0 | 0 | Channel 1 is alternative primary channel |
| 0 | 1 | Channel 2 is alternative primary channel |
| 1 | 1 | Channel 3 is alternative primary channel |
| 1 | 0 | Channel 4 is alternative primary channel |

In this way, the flexible channel allocation can be performed on a basis of the allocation field, and the alternative primary channel may be changed according to the allocation field.

As another embodiment, an allocated bandwidth can be informed each STA as follows using 2-bit information of the reserved subfield of the extended schedule element.

TABLE 6

| Bit 14 | Bit 15 | Description |
|--------|--------|-------------|
| 0 | 0 | Bandwidth is 2.16 GHz |
| 0 | 1 | Bandwidth is 4.32 GHz |
| 1 | 1 | Bandwidth is 6.48 GHz |
| 1 | 0 | Bandwidth is 8.64 GHz |

In this case, the bandwidth of one channel is assumed to be 2.16 GHz. In addition, channels allocated to each STA may be configured or selected in advance to indicate the bandwidth information as described above.

As a further embodiment, the PCP/AP or a non-PCP/AP STA can provide information on the channel bonding capability through an EDMG capabilities element included in the body of the management frame (e.g., beacon frame, association frame, etc.). More specifically, when a supported channel width set capable of supporting the EDMG capabilities element is provided, the PCP/AP or non-PCP/AP STA can provide information on its own channel bonding capability.

In addition, the PCP/AP or non-PCP/AP STA can provide information on the MIMO and OFDMA capabilities by adding a new field to the EDMG capabilities element.

Moreover, by adding an available multichannel access field to the EDMG capabilities element included in the body of the management frame (e.g., beacon frame, association frame, etc.), the PCP/AP or non-PCP/AP STA can inform whether the corresponding PCP/AP or non-PCP/AP STA has a capability of supporting access to other channels except the primary channel (or operating channel) during the DTI That is, through the above-described various methods, the STA can operate with respect to the separately configured primary channel (e.g., alternative primary channel) during the period in which the at least one channel is allocated through the above-described various methods even when the at least one channel except the primary channel predetermined by the system is allocated.

In this case, when the period in which the at least one channel is allocated ends, the STA can operate with respect to the primary channel predetermined by the system instead of the separately configured primary channel (e.g., alternative primary channel). To this end, the STA may use a duration-related field in the extended schedule element. In other words, after the end of the allocation period, the STA may operate with respect to the primary channel predetermined by the system, using the duration-related field. For example, the duration-related field in the extended schedule element may include an allocation start field, an allocation block duration field, a number of blocks field, and an allocation block period field.

Alternatively, when the STA receives a beacon frame indicating use of the primary channel predetermined by the system from the PCP/AP after transmitting data to a different STA during the allocation period, the STA may use the primary channel predetermined by the system rather than a channel designated as the alternative primary channel.

Alternatively, when completing the data transmission to the different STA, the STA may immediately use the primary channel predetermined by the system even though the allocation period does not end.

Figure 14:
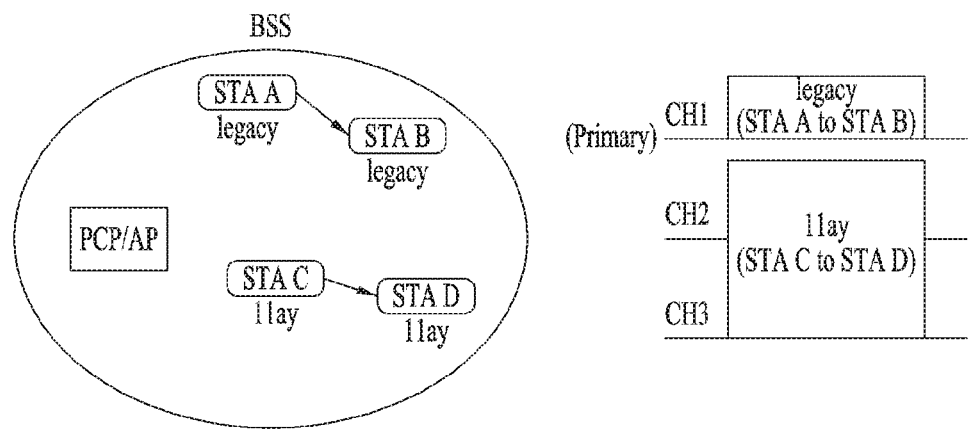
FIGS. 14 to 16 are diagrams for operation methods of an access point and a station according to the present invention.
Figure 15:
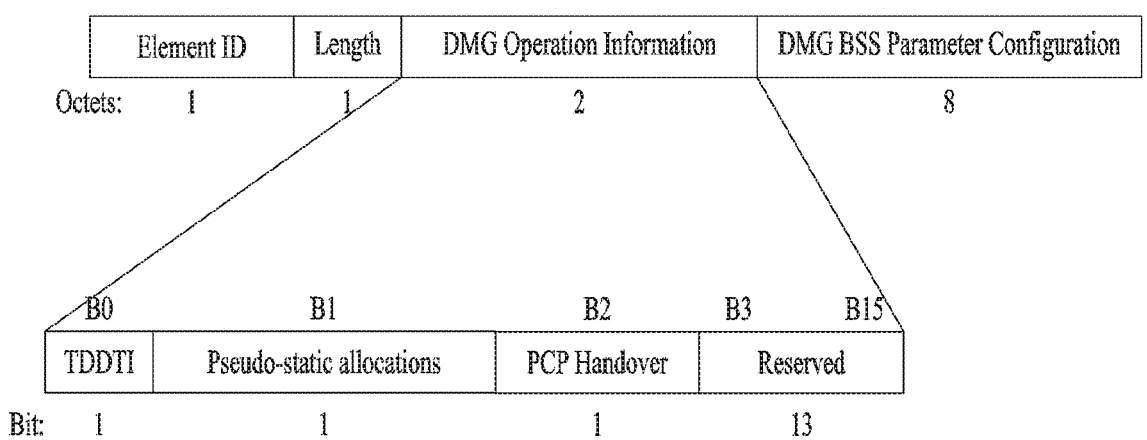
Figure 16:
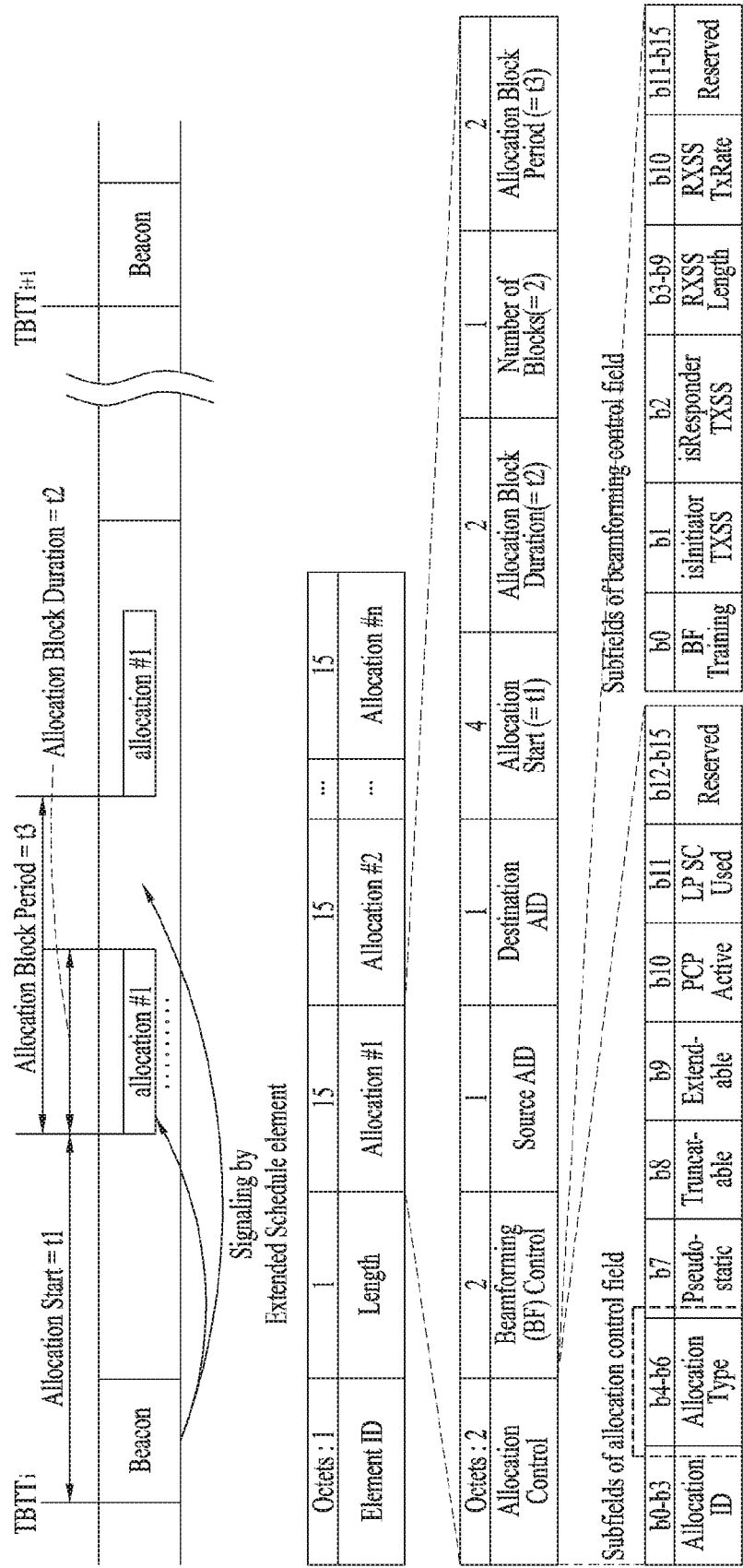

Hereinafter, a description will be given of operation when an STA according to the present and an STA supported by the conventional 11ad system coexist within one BSS. In FIGS. 14 to 16, the STA supported by the 11ad system is denoted as 'legacy' and the STA according to the present invention is denoted as '11ay'. That is, each of STA A and STA B are the legacy STA, and each of STA C and STA D are the 11ay STA.

As shown in FIG. 14, legacy STAs and 11ay STAs creates a BSS using the primary channel supported by the system as an operating channel during a BSS establishment or association process.

The legacy STA creates a link with the PCP/AP through the DMG operation element and DMG capabilities element. On the other hand, the 11ay STA can create a link with the PCP/AP by modifying the reserved bits included in DMG operation element and DMG capabilities element, which are defined in the conventional system, or defining the new EDMG operation element and EDMG capabilities element as described above.

Thereafter, the PCP/AP can check whether the 11ay STA can support the multi-channel operation through a negotiation process.

In addition, the 11ay STA can receive information on the primary channel and information on secondary channels through the DMG operation element and EDMG operation element while establishing the link with the PCP/AP.

As shown in FIG. 15, the PCP/AP can allocate at least one channel to each STA through the extended schedule element after establishing the link with each STA. For example, the PCP/AP may allocate the predetermined primary channel, CH1 to the legacy STA(s) and allocate CH2 and CH3 except CH1 to the 11ay STA(s) to prevent collisions between the legacy STA(s) and 11ay STA(s).

In this case, since the channels allocated to the 11ay STA does not include the primary channel predetermined by the system, CH1, the PCP/AP provides information indicating a channel used as a primary during a period in which CH2 and CH3 are allocated to the 11ay STA through the extended schedule element. To this end, the reserved bit information in the allocation control subfield of each allocation field in the extended schedule element may be used as described above.

As shown in FIG. 16, 11ay STAs and legacy STAs transmit and receive data or frames through allocated channels during the DTI. For example, STA A corresponding to the legacy STA transmits data to STA B through CH1, and STA C corresponding to the 11ay STA may transmit data to STA D through CH2 and CH3. In this case, if one of the CH2 and CH3 is busy, STA C may transmit data using one of them.

Specifically, STA C, which is the 11ay STA, uses CH2 or CH3 as the primary channel during the allocation period shown in FIG. 16. For example, if the PCP/AP transmits, to STA C, information indicating that CH2 will be used as the primary channel during the allocation period, the STA C may combine CH2 and CH3 with respect to CH2 and then transmit data to STA D. In addition, if the period allocated to STA C is the CBAP, STA C may perform a backoff procedure using CH2 and then decode a preamble of a PPDU frame.

Additionally, when STA C transmits data to STA D, an AID of STA C may be included in a source AID subfield of a specific allocation field of the extended schedule element transmitted from the PCP/AP to STA C and STA D, and an AID of STA D may be included in a destination AID subfield of the specific allocation field. In this case, a broadcast AID may be applied to each AID subfield, or a group ID of each STA may be applied.

In addition, whether the period allocated to STA C and STA D is the CBAP or SP may be informed through 'allocation type' in an allocation control field of the specific allocation field.

PPDU Format for OFDMA

Figure 17:
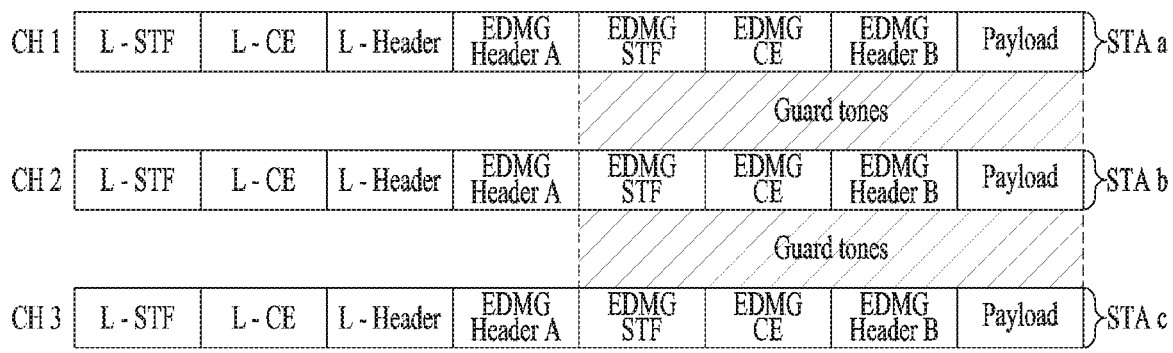
FIGS. 17 and 18 are diagrams illustrating a PPDU format for OFDMA according to the present invention.
Figure 18:
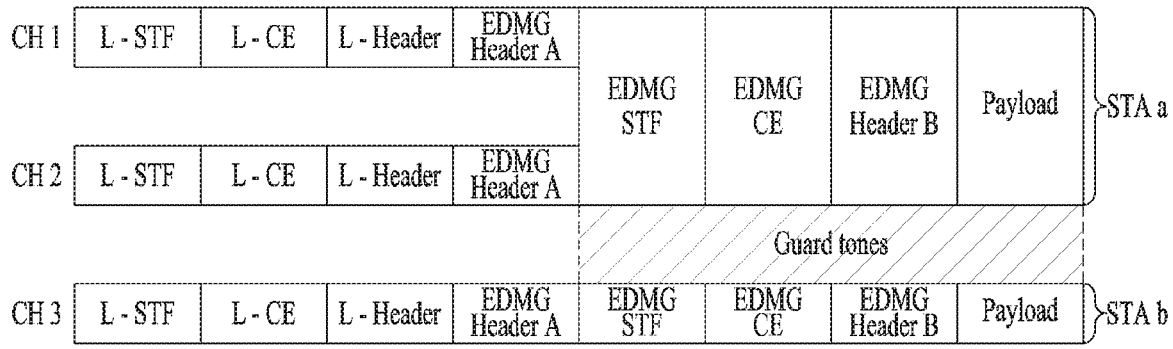

FIGS. 17 and 18 are diagrams illustrating a PPDU format for OFDMA according to the present invention. Specifically, FIG. 17 is a diagram illustrating a PPDU format for OFDMA when a single channel is assigned to each STA (channel boding is not included) and FIG. 18 is a diagram illustrating a PPDU format for OFDMA when a plurality of channels are assigned to a specific STA (channel boding is included).

As shown in FIGS. 17 and 18, a PCP/AP can identically or differently allocate an RU size to each of STAs. An STA can transmit data using channels as many as maximum channel boding capability of the STA using an OFDMA scheme. Hence, the RU size may have various sizes ranging from a BW corresponding to a single channel to a BW corresponding to 6 channels. Although a basic RU size is configured to be smaller than a BW corresponding to a single channel, the RU size can be variously deformed up to a BW corresponding to 6 channels.

Referring to the PPDU format shown in FIGS. 17 and 18, subcarriers, which are located between channels corresponding to an RU allocated to each STA, can be used as a guard tone. When OFDMA transmission is performed, the subcarriers can be transmitted in a manner of being nulled.

Tone Mapping

In an example applicable to the present invention, when a plurality of RUs are allocated to a specific STA (or, when an RU size allocated to a specific STA corresponds to a BW resulted from boding a plurality of channels), a PCP/AP applies a tone mapping method identical to a case of performing channel boding on a plurality of the channels to transmit a PPDU format to the specific STA. For example, if an RU size allocated to the specific STA corresponds to a BW corresponding to a case of boding 2 channels, the PCP/AP can transmit a PPDU format to the specific STA by applying a tone mapping method such as 2-channel bonding. In other word, the PCP/AP can transmit a signal to the specific STA by reusing a tone mapping method of 2-channel boding.

In this case, such a tone mapping method as a method of boding a plurality of channels can include a tone mapping method that uses subcarriers located between RUs allocated to STAs different from each other as a data tone and uses a part of other subcarriers as a guard tone. In other word, if the PCP/AP transmits a signal to an STA to which RUs identical to a BW as much as the certain number of channels are allocated according to the OFDMA method, similar to the tone mapping method of boding the certain number of channels, the PCP/AP may use all subcarriers located between channels as a guard tone or may use a part of the subcarriers as a data tone.

Figure 19:
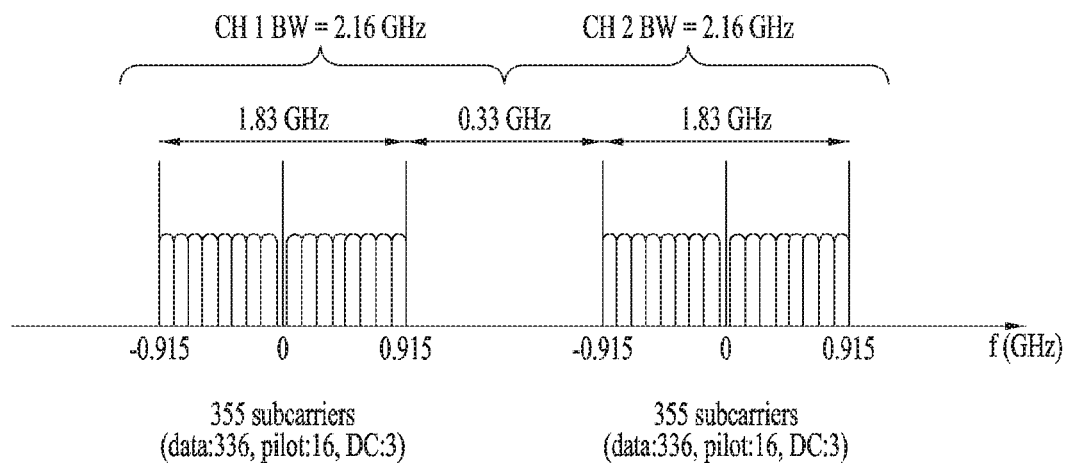
FIG. 19 is a diagram illustrating tone mapping according to the present invention.

FIG. 19 is a diagram illustrating tone mapping according to the present invention. FIG. 19 is a diagram proposing a BW corresponding to 2 channels and illustrates a case of applying tone mapping of OFDM PHY defined in 11ad system.

If the OFDMA method according to the present invention is applied, tone mapping configured to make DC to be positioned at the center can be applied to tones allocated to each STA.

As shown in FIG. 19, CH1 is assigned to a first STA, CH2 is assigned to a second STA, and a subcarrier (or, a tone) corresponding to 0.33 GHz positioned between the CH1 and the CH2 can be used as a guard tone. By doing so, it is able to mitigate interference received from an adjacent subcarrier.

Or, among subcarriers located between channels assigned to each STA, subcarriers used as a guard tone can be variably determined within 0.33 GHz.

Signaling

1. EDMG Header A

EDMG A can be transmitted in a duplicate mode via channels used in OFDMA.

A PCP/AP can provide information on an RU allocated to each STA via EDMG header A of a PPDU format. In other word, the EDMG A of the PPDU format can include the information on the RU allocated to each RU.

An STA participating in OFDMA decodes the EDMG header A through a primary channel configured by a system to identify an RU allocated to the STA.

As shown in FIGS. 17 and 18, the EDMG header A can be positioned prior to an STF (short training field) or a CE (channel estimation) field for a multi RU operation of an STA to which a plurality of RUs are allocated. Hence, an STA can obtain information included in the EDMG header A before a multichannel operation is performed.

The EDMG header A can include fields described in the following as an RU allocation field for each STA.

TABLE 7

| Field | | Bits | Description |
|---|---|---|---|
| RU allocation (STA 1) | AID or Partial AID | T.B.D. | |
| | RU allocation | | allocated RU size (unit of channel bandwidth) |
| | Number of SS | | |

TABLE 7-continued

| Field | | Bits | Description |
|---|---|---|---|
| RU allocation (STA 2) | AID or Partial AID | | |
| | RU allocation | | allocated RU size (unit of channel bandwidth) |
| | Number of SS | | |
| RU allocation (STA 3) | AID or Partial AID | | |
| | RU allocation | | allocated RU size (unit of channel bandwidth) |
| | Number of SS | | |
| RU allocation (STA 4) | AID or Partial AID | | |
| | RU allocation | | allocated RU size (unit of channel bandwidth) |
| | Number of SS | | |

(T.B.D.: To Be Determined)

According to the present invention, a PCP/AP can support maximum 6 STAs depending on an OFDMA scheme. Or, if the number of channels capable of being bonded by the PCP/AP is less than 6, the PCP/AP can support STAs as many as the number of channels capable of being maximally bonded.

Although Table 7 shows an example of applying AID information of each STA, it may use an ID of a group to which each STA belongs instead of the AID information depending on an embodiment.

Additionally, it may be able to provide information on the number of streams transmitted to each STA via a spatial stream number field in consideration of MIMO (multi input multi output) and OFDMA at the same time. In other word, the EDMG header A can include information on the number of spatial streams provided to each STA.

Or, it may be able to support OFDMA MU-MIMO by including a plurality of AID subfields in an RU allocation field shown in Table 7 and defining the number of spatial streams in a subfield thereof.

The RU allocation field shown in Table 7 can be configured as follows.

TABLE 8

| Field Name | Number of bits | Description |
|---|---|---|
| RU (bandwidth) | 2 | 0: 2.15 GHz (signle channel)<br>1: 4.32 GHz (2 channel bonding)<br>2: 6.48 GHz (3 channel bonding)<br>3: 8.64 GHz (4 channel bonding) |

TABLE 9

| Field Name | Number of bits | Description |
|---|---|---|
| RU (channel) | 3 | 0: signle channel<br>1: 2 channel bonding (CH1, CH2)<br>2: 2 channel bonding (CH2, CH3)<br>3: 2 channel bonding (CH3, CH4)<br>4: 3 channel bonding (CH1, CH2, CH3)<br>5: 3 channel bonding (CH2, CH3, CH4)<br>6: 4 channel bonding (CH1, CH2, CH3, CH4)<br>7: reserved |

TABLE 10

| Field Name | Number of bits | Description |
|---|---|---|
| STA[i]RU | 3 | i: ith STA<br>0: primary channel<br>1: 2 channel bonding (primary channel + secondary channel 1)<br>2: 2 channel bonding (primary channel + secondary channel 2)<br>3: 2 channel bonding (primary channel + secondary channel 3)<br>4: 3 channel bonding (primary channel + secondary channels 1, 2)<br>5: 3 channel bonding (primary channel + secondary channels 1, 3)<br>6: 3 channel bonding (primary channel + secondary channels 2, 3)<br>7: 4 channel bonding (primary channel + secondary channels 1, 2, 3)<br>0: reserved |

TABLE 11

| Field Name | Number of bits | Description |
|---|---|---|
| RU (chanel) | 3 | 0: CH1<br>1: CH2<br>2: CH3<br>3: CH4<br>4: 2 channel bonding (CH1, CH2)<br>5: 2 channel bonding (CH2, CH3)<br>6: 2 channel bonding (CH3, CH4)<br>7: reserved |

TABLE 12

| Field Name | Number of bits | Description |
|---|---|---|
| RU (chanel) | 4 | 0: CH1<br>1: CH2<br>2: CH3<br>3: CH4<br>4: 2 channel bonding (CH1, CH2)<br>5: 2 channel bonding (CH2, CH3)<br>6: 2 channel bonding (CH3, CH4)<br>7: 2 channel bonding (CH1, CH3): aggregation<br>8: 2 channel bonding (CH1, CH4): aggregation<br>9: 2 channel bonding (CH2, CH4): aggregation<br>10: 3 channel bonding (CH1, CH2, CH3)<br>11: 3 channel bonding (CH2, CH3, CH4)<br>12: 4 channel bonding (CH1, CH2, CH3, CH4)<br>13~15: reserved |

2. EDMG Header B

EDMG heard B includes device-specific information. In particular, a PCP/AP can provide specific information according to an STA via the EDMG header B.

In this case, the EDMG header B can include information described in the following.

Length. For example, the EDMG head B can differentially indicate length information by reusing length information positioned at a legacy header.

MCS (Modulation and Coding Scheme). For example, the EDMG head B can differentially indicate MCS information by reusing length information positioned at a legacy header.

CP length

Etc.

If a length of the EDMG header A is configured by 2 symbols or an MCS order is configured to be big, the entire information included in the EDMG header B can be included in the EDMG header A. In this case, the EDMG header B can be omitted form 11ay OFDMA PPDU format.

As shown in FIGS. 17 and 18, the EDMG header B can be positioned after the EDMG header A in a time domain within a PPDU format.

Scheduling

A PCP/AP and an STA can indicate channel boding capability of the PCP/AP and the STA (non-PCP/AP) via a management frame (beacon frame, association frame, etc.) body including an EDMG capabilities element. To this end, the EDMG capabilities element can include a supported channel width set field indicating the channel boding capability of the PCP/AP and the STA.

The PCP/AP and the STA define a new field within the EDMG capabilities element to indicate capability related to MIMO and OFDMA.

Figure 20:
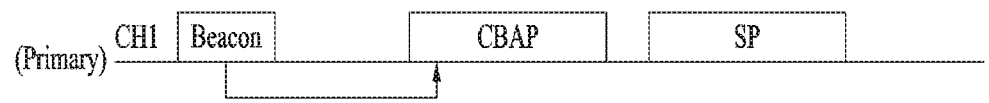
FIG. 20 is a diagram illustrating a scheduling-based signaling configuration according to the present invention.

In legacy 11ad system, an extended schedule element is defined in a beacon frame body and an announce frame body. FIG. 20 illustrates a configuration of the extended schedule element and a configuration for signaling the extended schedule element via a beacon. As shown in FIG. 20, the PCP/AP can allocate CBAP corresponding to a channel access scheme in DTI section and an SP section to STAs via the extended schedule element.

The PCP/AP or an STA can support OFDMA using a source AID and a destination AID of the extended schedule element. More specifically, if the source AID and the destination AID are configured as a table described in the following, it is able to indicate whether the PCP/AP or the STA supports DL OFDMA or UL OFDMA during an allocated section of a prescribed length.

TABLE 13

| Source AID | Destination AID | Description |
| --- | --- | --- |
| PCP/AP | EDMG Broadcast Intended STAs | Downlink OFDMA |
| EDMG Broadcast Intended STAs | PCP/AP | Uplink OFDMA (trigger frame needs to be defined newly) |

In the table, EDMG Broadcast corresponds to a broadcast signal broadcasted to 11ay STAs capable of supporting OFDMA only. Intended STAs correspond to a selected specific STA.

It may be able to enable STAs supporting OFDMA to access a channel only via the abovementioned signaling. STAs (e.g., legacy STAs) not supporting OFDMA may operate in a sleep mode to reduce power consumption during a prescribed time allocated by the abovementioned signaling.

A signal can be transceived between STAs by applying an OFDMA method without the PCP/AP. For example, If an STA has capability capable of transmitting a signal using OFDMA, the STA can be designated as a source AID of the extended schedule element (P2M (peer-to-machine), etc.)).

The aforementioned intended STAs can be individually designated. In allocation fields #1~# n shown in FIG. 20, a source AID or a destination AID can be designated by a single STA. In this case, it may be able to schedule channel access periods to be overlapped with each other using allocation start, allocation block duration, number of blocks, and allocation block period included in each allocation field (allocation # n).

As a different example, a source AID or a destination AID can be designated using a group ID rather than EDMG Broadcast or Intended STA.

The OFDMA method can be applied to an SP section only or a CBAP section only. Or, the OFDMA method can be applied to both the SP section and the CBAP section.

As mentioned earlier with reference to the table, in order to support UL OFDMA, it is necessary to newly define a trigger frame. The trigger frame can be configured in control PHY mode.

Channel Access for OFDMA

The allocation control field (Extended Schedule element→Allocation #→Allocation control field) shown in FIG. 20 includes an allocation type sub field. In this case, a PCP/AP and an STA can indicate 'OFDMA allocation' via a reserved bit of the allocation type sub field. Then, a channel access scheme can be used for OFDMA only in DTI section.

In this case, it may reuse Broadcast supported by a legacy system without newly defining EDMG Broadcast. This is because an STA capable of decoding signaling corresponding to the 'OFDMA allocation' corresponds to the 11ay STA only proposed by the present invention.

As an additional example, it is able to indicate whether an OFDMA operation corresponds to UL OFDMA or DL OFDMA via an AID configuration shown in Table 13 together with the 'OFDMA allocation' signaling.

Proposed OFDMA Schemes

1. Granularity of Subband

FIG. 21 is a diagram illustrating a result resulted from comparing a case (hereinafter, first case) that an RU size corresponds to a BW of 1 channel with a case (hereinafter, second case) that an RU size corresponds to a BW narrower than the BW of 1 channel.

As shown in FIG. 21, if it is assumed that the number of channels supported by a system corresponds to 4 in total, signals can be transmitted at the same time by maximum 4 STAs in the first case and signals can be transmitted at the same time by 8 STAs in the second case.

In terms of signaling overhead, since the second case is able to support more STAs compared to the first case, as the number of STAs increases, the signaling overhead and scheduling overhead may increase. In particular, if there is no fine frequency scheduling, it is difficult to expect significant gain.

In terms of feedback overhead, the second case may have a large coherent BW due to characteristic of EHF (extremely high frequency). Yet, total reporting time may linearly increase as the number of supported STAs increases.

In terms of an impact on a frame structure, MU-MIMO frame structure in a legacy system can be reused in the first case. On the contrary, it is necessary to newly define an optimized frame structure for OFDMA in the second case.

In terms of complexity, most of parameters (e.g., encoding block size, tone mapping, etc.) for legacy 11ad system and channel boding can be reused in the first case. On the contrary, it is necessary to newly define an encoding block for each scheduled RU size in the second case. In other word, hardware complexity can be increased in the second case.

2. FFT Size of Receivers

Figure 22:
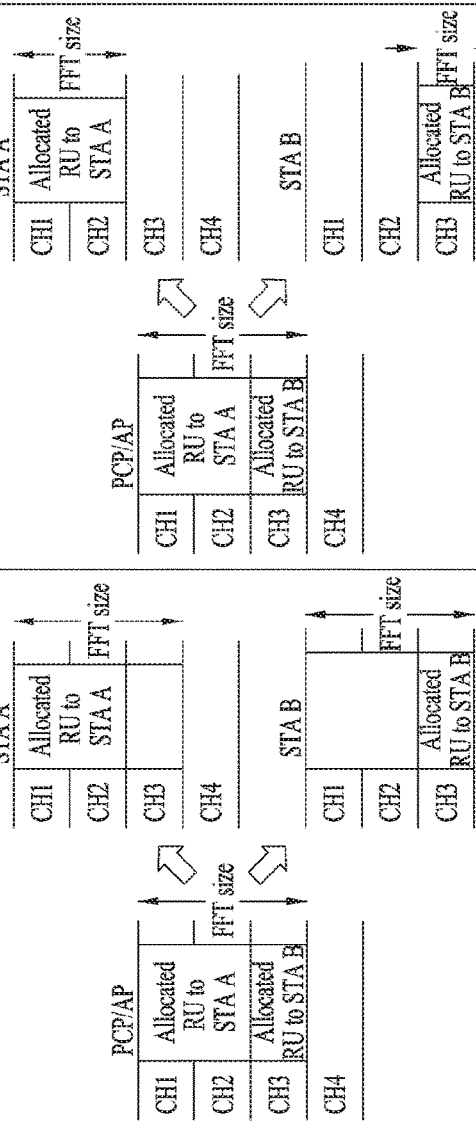
FIG. 22 is a diagram for comparing a system characteristic according to an FFT size of a PCP/AP and an STA.

FIG. 22 is a diagram for comparing a case (hereinafter, third case) that an FFT size of a PCP/AP is identical to an FFT size of an STA with a case (hereinafter, fourth case) that the FFT size of the PCP/AP is different from the FFT size of the STA.

In the third case, only STAs having the same FFT size with a PCP/AP can participate in OFDMA. On the contrary, in the fourth case, any of STAs having different FFT size with a PCP/AP can participate in OFDMA.

In terms of feedback, one of more STAs can report channel state information on whole frequency which is used for OFDMA transmission at a time in the third case. On the contrary, one of more STAs can report channel state information on partial frequency as much as own FFT size at a time in the fourth case. Hence, the fourth case requires more time in reporting all channels compared to the third case.

When FFT size of STA participating in OFDMA is different from FFT size of PCP/AP, method of performing feedback As mentioned earlier in the fourth case of FIG. 22, FFT sizes of STAs participating in OFDMA may vary. When a PCP/AP transmits PPDU, an FFT size of the PCP/AP may be bigger than an FFT size of an STA. Hence, the STA may fail to feedback information on channels used by the PCP/AP at a time.

An STA according to the present invention can feedback channel state information to the PCP/AP using one of methods described in the following.

As an example, the STA can perform feedback on channels on which a PPDU is transmitted by the PCP/AP several times. In particular, the STA can perform feedback on a bandwidth corresponding to an FFT size of the PCP/AP by performing feedback several times on a bandwidth corresponding to an FFT size of the STA.

As a different example, the STA performs feedback on a channel (i.e., primary channel) on which decoding is performed one time only and the PCP/AP considers that a different channel and the primary channel are in a similar state based on property of ultrahigh frequency band. By doing so, the PCP/AP can identify a status of the whole channel band.

Figure 23:
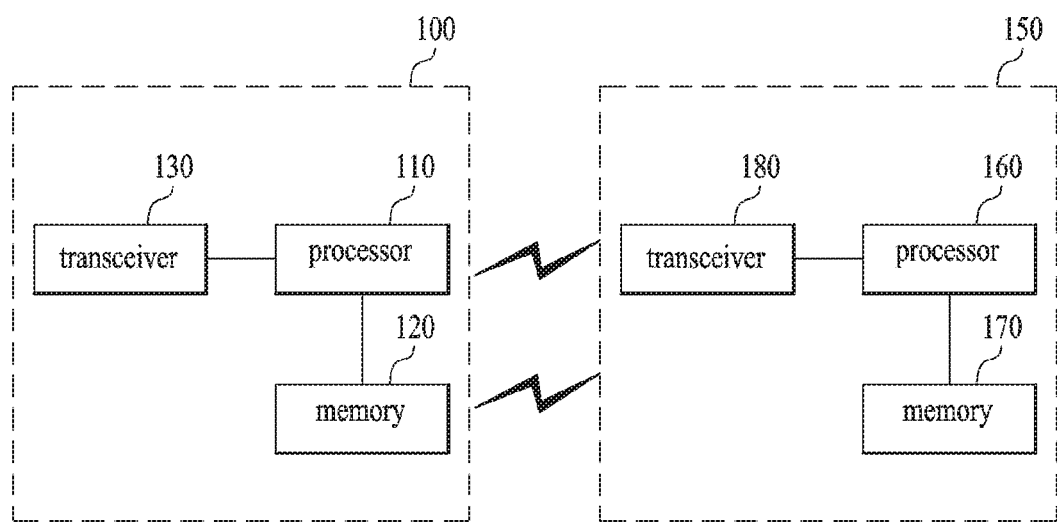
FIG. 23 is a diagram illustrating a device for implementing the aforementioned method.

As a further different example, the STA may reduce overhead via random scheduling performed by the PCP/AP and increase channel utilization by using frequency resources as many as possible FIG. 23 is a diagram illustrating devices for implementing the above-described method.

The wireless device 100 of FIG. 23 may correspond to a specific STA of the above description, and the wireless device 150 may correspond to the PCP/AP of the above description.

The STA 100 may include a processor 810, a memory 120 and a transceiver 130. The PCP/AP 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

INDUSTRIAL APPLICABILITY

Although the present invention is described on the assumption that the invention is applied to the WLAN system based on IEEE 802.11, it is not limited thereto. The present invention can be applied to various wireless systems capable of data transmission based on channel bonding in the same manner.

What is claimed is:

1. A method of operating a first station (STA) in a wireless LAN (WLAN), the method comprising:
   receiving assignment information on one or more channels from an access point (AP) through a first primary channel; and
   based on the first primary channel being not included in the one or more channels, receiving information indicating that a channel among the one or more channels is designated as a second primary channel from the AP,
   wherein the first STA uses the second primary channel as a primary channel during a period to which the one or more channels are assigned,
   wherein, in a case where the first STA receives a beacon frame indicating to use the first primary channel as a primary channel from the AP after data is transmitted to a second STA, the first STA uses the first primary channel as a primary channel instead of the second primary channel, and
   wherein, in a case where data transmission transmitted to the second STA is completed, the first STA immediately uses the first primary channel as a primary channel instead of the second primary channel.

2. The method of claim 1, wherein based on the one or more channels corresponding to a plurality of channels, the first STA transmits data to a second STA by combining a plurality of the channels with each other on the basis of the second primary channel.

3. The method of claim 1, wherein the assignment information on the one or more channels and information on the second primary channel are received through an enhanced directional multi-gigabit (EDMG) beacon or an announcement frame.

4. The method of claim 1, wherein the period to which the one or more channels are assigned contains a contention-based access period (CBAP) or a service period (SP) and wherein if the period to which the one or more channels are assigned corresponds to the CBAP, the first STA performs backoff or frame decoding through the second primary channel.

5. The method of claim 1, wherein the assignment information on the one or more channels and information on the second primary channel are transmitted through an enhanced directional multi-gigabit (EDMG) beacon or an extended schedule element contained in an announcement frame.

6. The method of claim 5, wherein the extended schedule element comprises an allocation control field and wherein the allocation control field comprises the information on the second primary channel and information on a bandwidth allocated to the first STA.

7. The method of claim 1, wherein information on whether or not the first STA is able to access a different channel rather than the first primary channel during data transfer interval (DTI) is additionally transmitted to the AP.

8. The method of claim 1, wherein if the period to which the one or more channels are assigned ends, the first STA uses the first primary channel as a primary channel instead of the second primary channel.

9. A station operating in a wireless LAN (WLAN), the station comprising:
- a transceiver configured to receive scheduling information from an access point (AP) with one or more radio frequency (RF) chains; and
- a processor configured to process the scheduling information received by the transceiver in a manner of being connected with the transceiver, wherein the processor:
controls the transceiver to receive assignment information on one or more channels from the AP through a first primary channel,
based on the first primary channel being not included in the one or more channels, controls the transceiver to receive information indicating that a channel among the one or more channels is designated as a second primary channel from the AP, and
uses the second primary channel as a primary channel during a period to which the one or more channels are assigned,
wherein, in a case where the STA receives a beacon frame indicating to use the first primary channel as a primary channel from the AP after data is transmitted to another STA, the STA uses the first primary channel as a primary channel instead of the second primary channel, and
wherein, in a case where data transmission transmitted to the another STA is completed, the STA immediately uses the first primary channel as a primary channel instead of the second primary channel.

* * * * *